(12) United States Patent
Kamata

(10) Patent No.: US 6,612,755 B1
(45) Date of Patent: Sep. 2, 2003

(54) SHUTTER DEVICE OF CAMERA

(75) Inventor: Kazuo Kamata, Minami-Ashigara (JP)

(73) Assignee: Fuji Photo Film.Co., Ltd., Kanagawa (JP)

( * ) Notice: Subject to any disclaimer, the term of this patent is extended or adjusted under 35 U.S.C. 154(b) by 0 days.

(21) Appl. No.: 10/303,823

(22) Filed: Nov. 26, 2002

(30) Foreign Application Priority Data

Nov. 28, 2001 (JP) ........................................ 2001-362982

(51) Int. Cl.⁷ .............................. G03B 9/00; G03B 17/02
(52) U.S. Cl. ........................................... 396/458; 396/6
(58) Field of Search ................................. 396/458, 460, 396/493, 494, 502, 509, 180, 459, 505, 6

(56) References Cited

U.S. PATENT DOCUMENTS

| | | | | | |
|---|---|---|---|---|---|
| 5,296,885 A | * | 3/1994 | Sangregory et al. | ........ | 396/452 |
| 6,418,278 B1 | * | 7/2002 | Bittner | ........ | 396/493 |
| 6,493,513 B1 | * | 12/2002 | Noguchi et al. | ........ | 396/257 |

* cited by examiner

*Primary Examiner*—Christopher Mahoney
(74) *Attorney, Agent, or Firm*—Young & Thompson

(57) ABSTRACT

A shutter device includes a shutter blade for opening and closing a shutter opening and a stop plate having a small stop of a shutter opening. While the small stop is disposed on the shutter opening, the shutter blade swings from a primary position responding to operation of shutter release. After the shutter blade leaves the shutter opening, a flashlight is emitted. Thereafter, the stop plate swings sequentially such that the shutter opening may entirely appear, and then the shutter blade swing back to the primary position with covering the small stop.

16 Claims, 6 Drawing Sheets

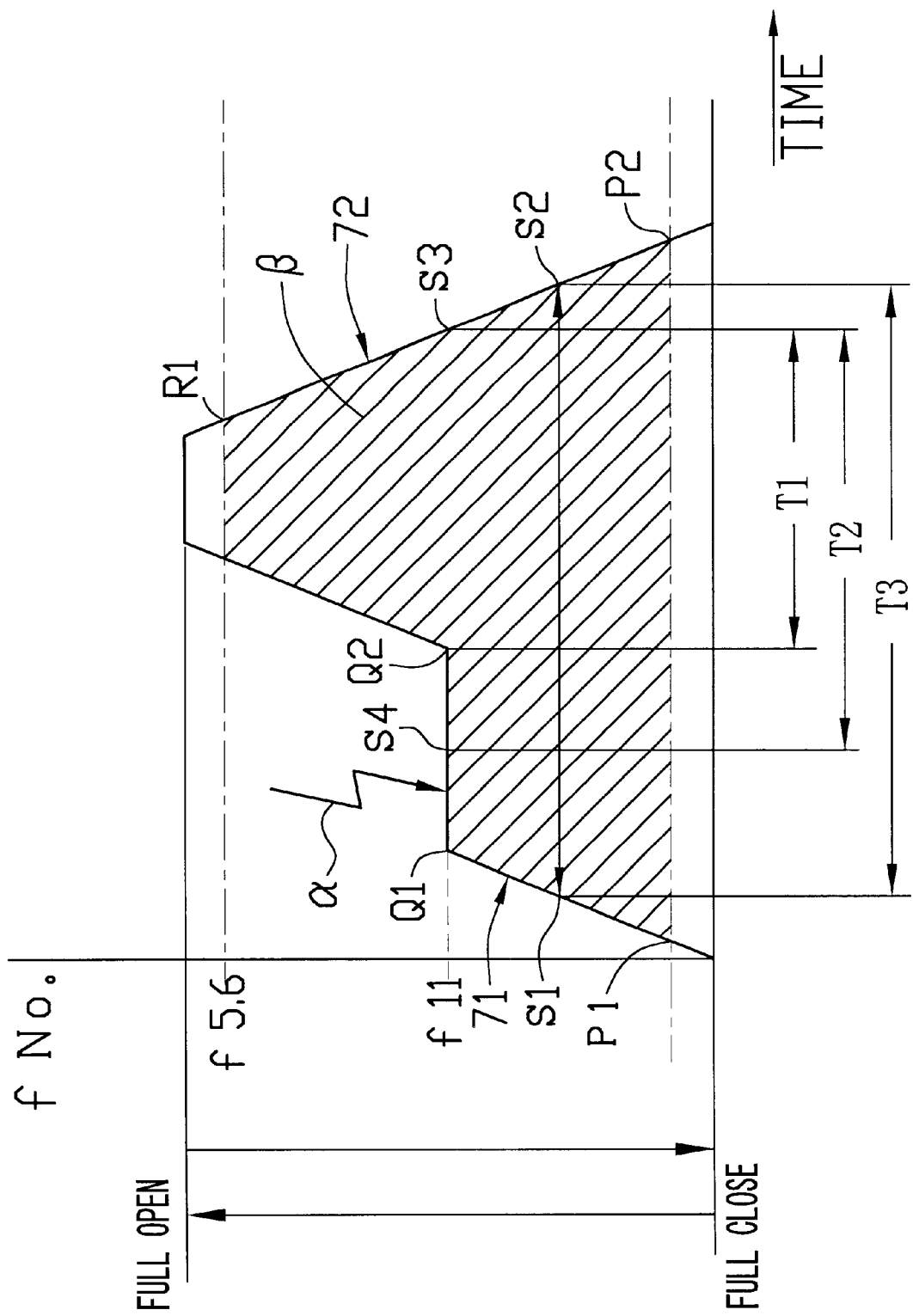

SHUTTER DEVICE OF CAMERA

BACKGROUND OF THE INVENTION

1. Field of the Invention

The present invention relates to a shutter device of a camera with which a soft focusing photography can be carried out.

2. Description Related to the Prior Art

In a market is sold a cheap camera, in which a photo film can be changed and a focus mechanism and an exposure mechanism are omitted. Further, as a type of the cheap camera, a lens-fitted photo film unit is widely known, which includes a simple photographic mechanism and in which the filmstrip is previously loaded in producing process. The lens-fitted photo film unit can be used only once, and when a user thereof provides it to a photofinisher without removing the filmstrip, he can obtain a processed filmstrip and photo prints.

Such a sort of the camera has a simple structure to be produced in a low cost. For example, a fixed focus type of a taking lens is used, which is constructed of one or two lens elements, and a hitting type of the shutter device is used. In the hitting type, a swingable shutter blade is hit by a release lever, and thereafter swung back by bias of a spring.

As a method of portrait photography, there is a soft focusing photograph. When a soft focusing photograph is designated with use of a normal camera, a filter for the soft focusing photograph is provided in front of a taking lens of the normal camera. By making the soft focusing photograph, a small part of an incident light into the taking lens irregularly reflects to form a portrait image whose outlines of objects are reproduced in a suitably smaller sharpness.

In the normal camera in which the focusing can be made, outlines in the image are adequately softened with the filter for the soft focusing photography. However, an inexpensive camera includes a taking lens of a fixed focus, which is likely to form a certain image out of focus. If the soft focusing filter is combined with the fixed-focus camera, an out-of-focus image may be recorded also with softened portions at smaller sharpness, to result in an unacceptable photograph. If good image quality is intended at a low cost, no soft focusing photography is available.

SUMMARY OF THE INVENTION

An object of the present invention is to provide a shutter device capable of soft focusing photography even in a camera, in which a fixed focus type of a taking lens is loaded.

In order to achieve the object and the other objects, a shutter device of the present invention that is loaded in a camera, has a movable hitting member and a swingable shutter blade for opening and closing a shutter opening. When the shutter blade is hit by the hitting member moving in response to a photographic operation to swing in a first direction, the shutter opening is exposed. In an aperture stop plate, a stop opening for the shutter opening is formed. In a stop position in which the stop opening covers a part of the shutter opening, the hitting member hits the stop plate after swing of the shutter blade, so the stop plate swings in the first direction.

When the shutter opening is entirely exposed, the stop opening formed in the stop plate is disposed on the shutter blade. On the shutter blade a ridge portion is formed for receiving the stop plate. Further, the shutter blade is biased in a second direction opposite to the first direction by a first spring. After entire exposure of the shutter opening, the shutter blade swings in the second direction and closes the shutter opening while the ridge portion presses the stop plate.

The stop plate is biased in the second direction by a second spring and kept in the stop position by a retention pin provided in a side in the second direction of the stop plate. When the retention pin is moved, the stop plate biased by the second spring shifts toward a retracted position in the second direction. In the retracted position the stop plate is retracted from the shutter opening.

Further, the camera having the shutter device includes a flash device and a sync switch for actuating the flash device. When the shutter blade retracts from the stop opening, the shutter blade turns the sync switch ON and actuates the flash device.

According to the camera in which the shutter device of the present invention is loaded, as the shutter blade and the stop plate are sequentially swung by the hitting member which shifts responding to photographic operation, a sharp image formed through the small stop and a slightly softened image formed through a fully open stop are synthesized in a frame. Therefore, the soft focusing photography adequate to the portrait photograph can be performed without adjustment of focus.

Further, as the flashlight is emitted during the exposure through the small stop, the image with sharp outlines is adequately formed in the exposure through the small stop, in which exposure amount would be sometimes not enough.

BRIEF DESCRIPTION OF THE DRAWINGS

The above objects and advantages of the present invention will become easily understood by one of ordinary skill in the art when the following detailed description would be read in connection with the accompanying drawings.

FIG. 5 is a graph illustrating a variation of f-number during photographic movement.

PREFERRED EMBODIMENTS OF THE INVENTION

Figure 1:
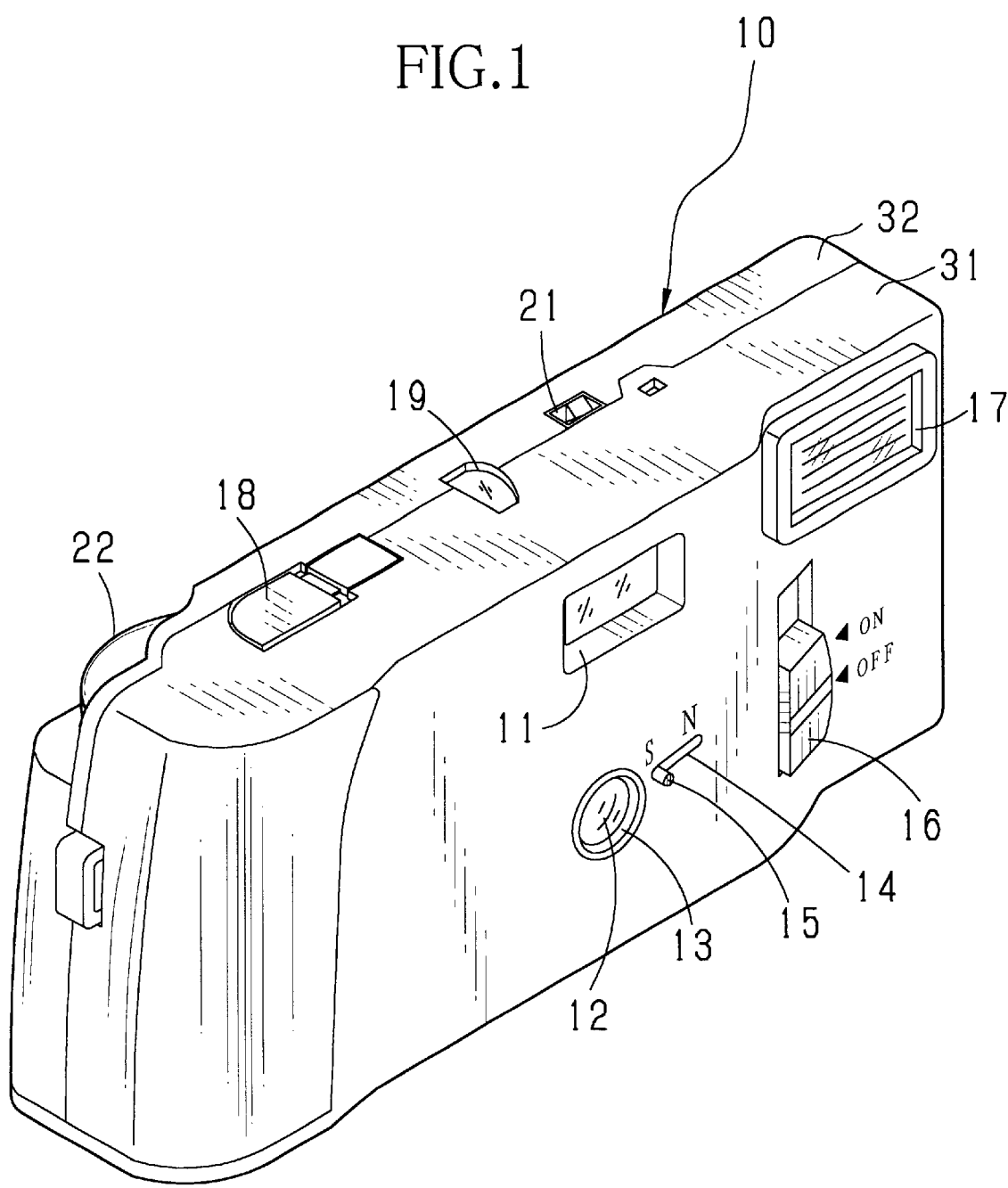
FIG. 1 is a perspective view of a lens-fitted photo film unit in which a shutter device of the present invention is loaded.

As shown in FIG. 1, a lens-fitted photo film unit 10 as camera includes a taking lens 12, a mode changer 15, a flash operation member 16 or charger button, a shutter release button 18, a front cover 31 and a rear cover 32. In the front cover 31 are formed an objective window 11 of a viewfinder, a lens opening 13, a slide hole 14 and a flashlight window 17. The taking lens 12 appears from the lens opening 13. A focal length F of the taking lens 12 is 32 mm, and a distance (object distance) from a photo film 34 (see FIG. 2) to an object is fixed to 6m for forming a focused image of object.

The mode changer 15 has a stick-like shaped form (see, FIG. 3), and is provided so as to slide in the slide hole 14 formed in the front cover 31. When the mode changer 15 is slid, the camera is set to a soft focusing photograph mode (S) or to a normal photograph mode (N). Note that this figure, the mode changer 15 is set to the soft focusing mode (S).

A winding wheel 22 appears from the rear cover 32, and in the rear cover 32 an eye-piece window 23 (see FIG. 2) is formed. Further, between the front cover 31 and the rear cover 32, a frame counter window 19 and a charged state indicator window 21 are formed.

Figure 2:
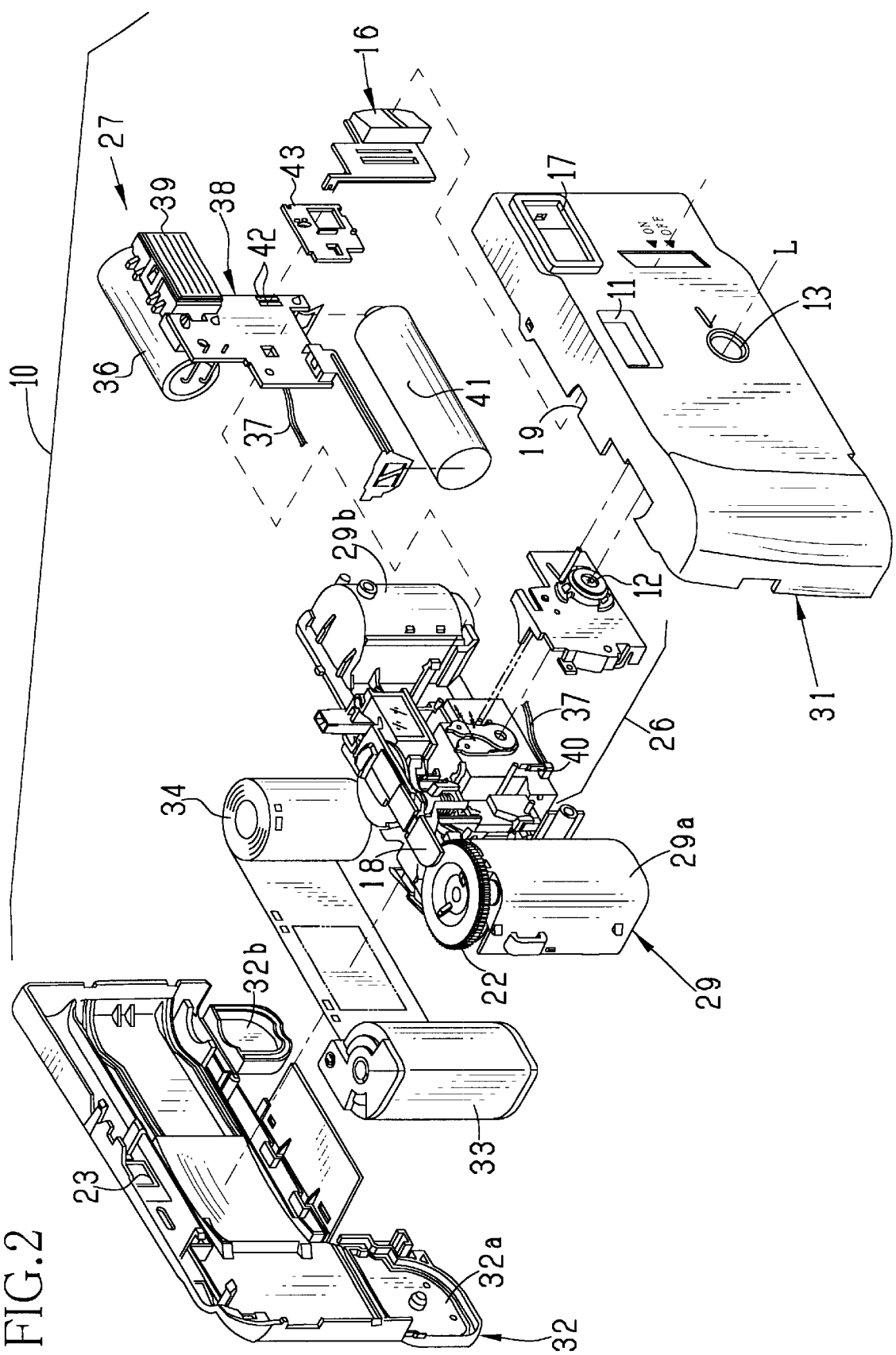
FIG. 2 is an exploded view of the lens-fitted photo film unit in FIG. 1.

As shown in FIG. 2, the lens-fitted photo film unit 10 includes a main body 29, a cartridge 33 and the photo film 34 inside the front and rear covers 31, 32. A front face of the main body 29 is provided with an exposure section 26, which has a cartridge chamber 29a and a film roll chamber 2b. In the cartridge chamber 29a, the cartridge 33 is previously loaded. In the film roll chamber 29b a roll of the photo film 34 is provided. The photo film 34 is extended behind the main body 29, and an end is fixed to a spool (not shown) of the cartridge 33 for winding the exposed photo film 34. Note that a film sensitivity of the photo film 34 is ISO 400 in this embodiment.

The cartridge chamber 29a and the film roll chamber 29b are kept in a light-tight fashion by respective bottom lids 32a, 32b. The bottom lid 32a is opened to remove the cartridge 33 containing the photo film 34 after completion of exposure.

The winding wheel 22 is attached to a top of the film roll chamber 29a. On a bottom of the winding wheel 22 a winding shaft (not shown) is formed for rotating a spool (not shown) of the cartridge 33. By rotating the winding wheel 22 every time after exposure, the photo film 34 is wound around the spool in the cartridge 33. In accordance with the operation of the winding wheel 22 to wind the photo film 34, a hitting lever 58 (see, FIG. 3) assembled in the exposure section 26 is set to a charged condition. Further, after winding the photo film 34 for a frame, the rotation of the winding wheel 22 is locked by a lock lever (not shown) assembled in the main body 29. On a rear face of the exposure section 26, an exposure aperture (not shown) is formed to determine an exposure area of a frame on the photo film 34.

A flash device 27 includes a main capacitor 36, a cord 37, a sync switch 40, a circuit board 38, a flashlight emitter 39 and a battery 41. The flashlight emitter 39 has a flash tube, a reflector (not shown) and the like. On the circuit board 38, a circuit pattern is printed and several sorts of circuit elements, such as a booster coil (not shown), are attached to form a flash circuit (not shown). A front face of the circuit board 38 is provided with a pair of switch segments 42. Further, the sync switch 40 is connected through the cord 37 to the circuit board 38. The sync switch 40 consists of a pair of segments 40a, 40b that are slightly apart from and confronting to each other. When the segments 40a, 40b contact, the sync switch 40 turns ON.

Further, on the front face of the circuit board 38, the flash operation member 16 is attached through a middle plate 43 so as to be slidable between ON and OFF positions. A connecting segment is fixed on the rear of the flash operation member 16 for interconnecting the switch segments 42. When the flash operation member 16 is slid into the ON position, the drive switch conducts between the switch segments 42 to start charging for emitting the flashlight.

Figure 3:
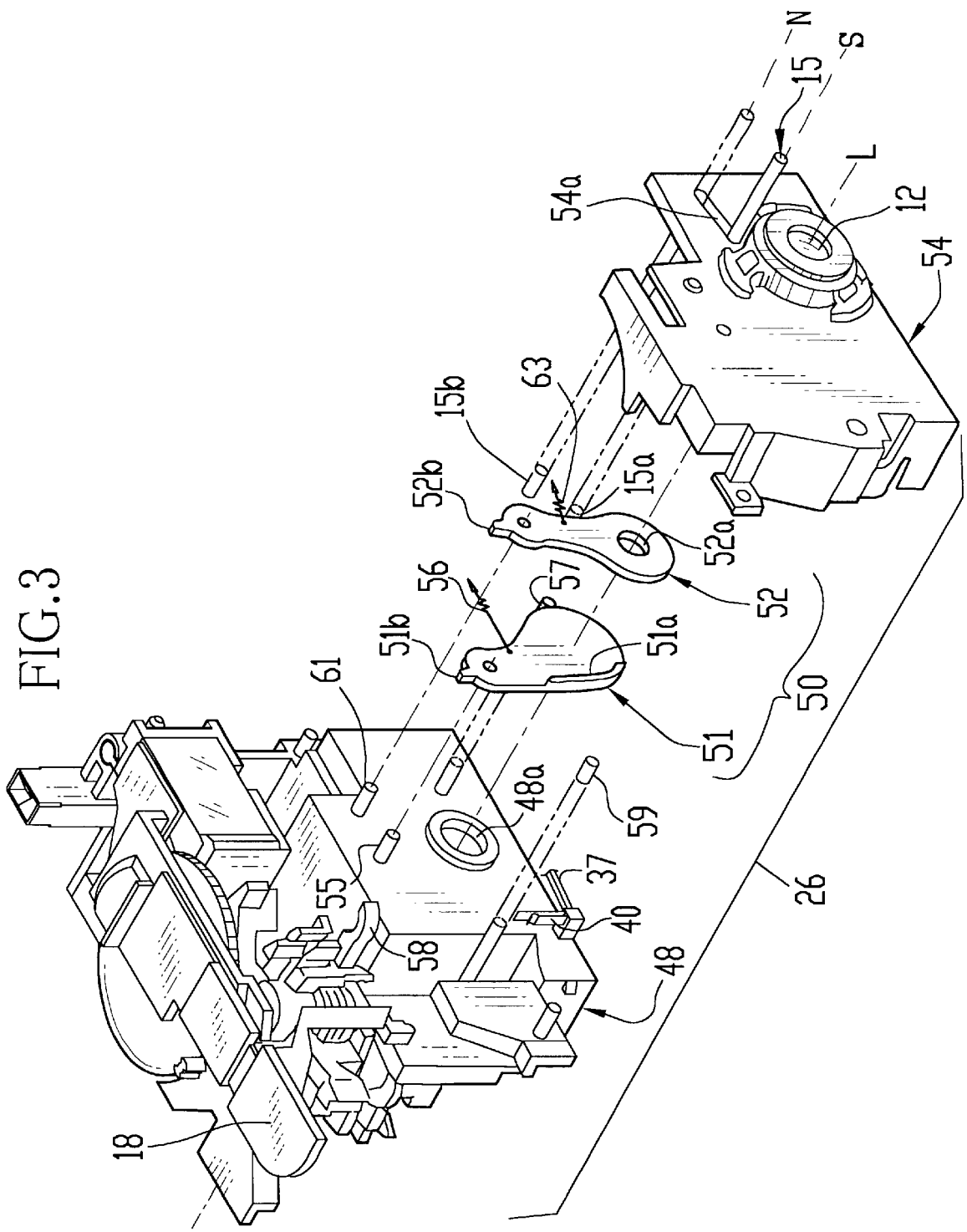
FIG. 3 is an exploded view of an exposure section of the lens-fitted photo film unit in FIG. 1.

As shown in FIG. 3, the exposure section 26 has a light-shielding tube 48 or box protruding forwardly from the main body 29, a shutter device 50, and a shutter cover 54. The light-shielding tube 48 has a nearly rectangular shape, and on a front face thereof a shutter opening 48a is formed. The light-shielding tube 48 is provided with the shutter device 50 having a shutter blade 51, an apperture stop plate 52, a spring 56 and the hitting lever 58. The shutter blade 51 and the stop plate 52 are covered with the shutter cover 54 provided with the taking lens 12.

On the front face of the light-shielding tube 48 are formed shafts 55, 61 and a stopper 57. The shutter blade 51 is rotatably attached to the shaft 55 such that a position of the attachment of the shutter blade is determined to an optical axis L of the taking lens 12. The shutter blade 51 is biased by the spring 56 so as to contact to the stopper 57. Further, the light-shielding tube 48 is provided with a stopper 59 for regulating the rotation of the shutter blade 51. The shutter blade 51 is provided with a ridge portion 51a along the edge of a side confronting to the stopper 59. The stop plate 52 rotates to contact to the ridge portion 51a.

The stop plate 52 is rotatably attached to the shaft 61 at one end, and biased by a spring 63 so as to contact to a retention end pin 15a of the mode changer 15. In the other end of the stop plate 52, a small stop opening 52a is formed.

The mode changer 15 is slidable in a long hole 54a formed in the shutter cover 54, and set to a soft focusing photograph position (S) in FIG. 3. When the mode changer 15 is slid to a right side of the long hole 54a, the stop plate 52 is swung by a bias of the spring 63 to the outside of the shutter opening 48a, and thus the mode changer 15 is set to a normal photograph position (N) which is illustrated with a phantom line.

Figure 4A:
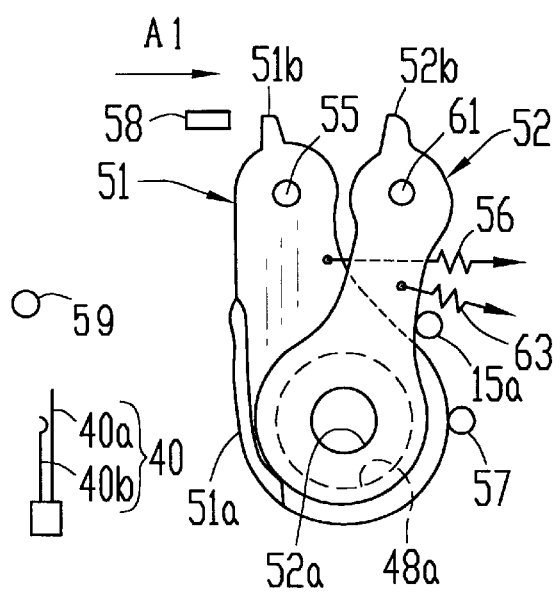
FIG. 4A is a front view of the shutter device of the present invention in a soft-focusing photograph mode, which illustrates a situation before photographic movement.
Figure 4B:
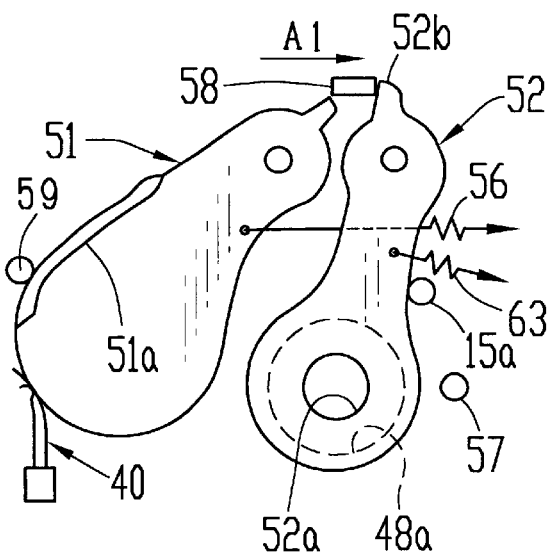
FIG. 4B is a same view as FIG. 4A, which illustrates a situation that only the shutter blade is hit.

In FIG. 4A, the hitting lever 58 is set to a primary position. In this situation, the shutter blade 51 entirely covers the shutter opening 48a by contacting to the stopper 57. The stop plate 52 contacts the mode changer 15 which is set to the soft focusing photograph position, such that the stop opening 52a may be disposed on the shutter opening 48a. In accordance with the shutter release, the hitting lever 58 shifts in a direction Al to push an end protrusion 51b formed on a top of the shutter blade 51. Thus the shutter blade 51 swings in a clockwise direction against the bias of the spring 56. Then, as shown in FIG. 4B, the hitting lever 58 leaves an end protrusion 51b and the shutter blade 51 contacts to the stopper 59. In this situation, an f-number of the stop is f11, and an end of the shutter blade 51 presses a segment 40a to a segment 40b of the sync switch 40. The sync switch 40 is turned on.

Figure 4C:
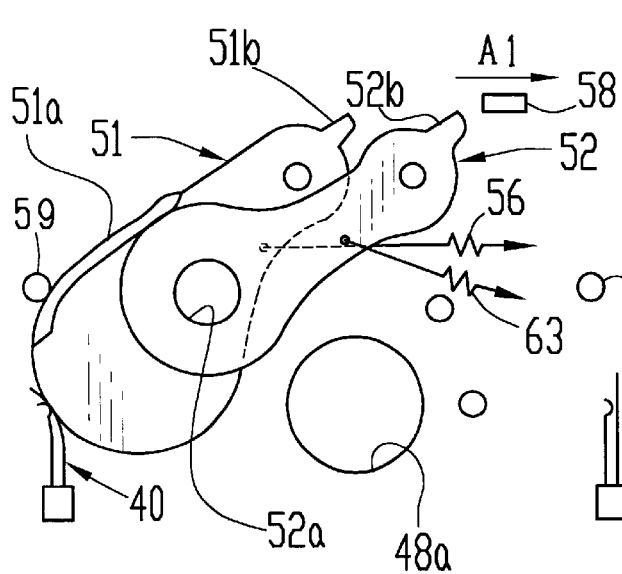
FIG. 4C is a same view as FIG. 4B, which illustrates a situation that the stop plate is hit.

The hitting lever 58, after leaving the end protrusion 51b, contacts to an end protrusion 52b formed on a top of the stop plate 52. Thus the stop plate 52 swings in a clockwise direction against a bias of the spring 63. Then, as shown in FIG. 4C, the hitting lever 58 leaves the end protrusion 52b to contact to the ridge portion 51a of the shutter blade 51. Thereby the shutter blade 51 contacts to the stopper 59 to keep the sync switch 40 turned ON. Thus the shutter opening 48a entirely appears to form a stop whose f-number is f5.6.

Figure 4D:
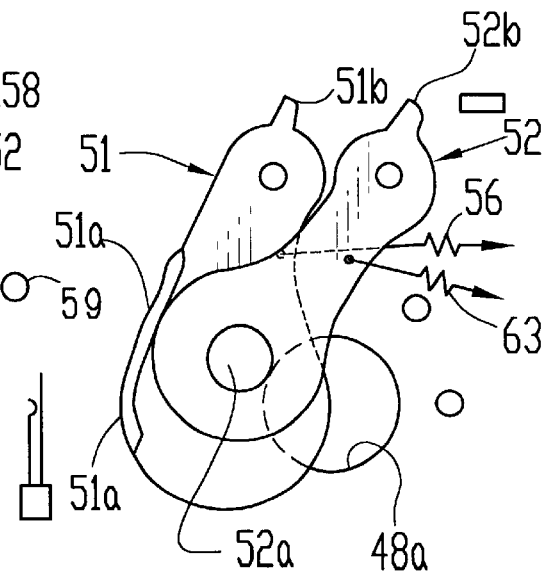
FIG. 4D is a same view as FIG. 4C, which illustrates a situation that the shutter blade and the stop plate return to a primary position.

After the stop plate contacts to the ridge portion 51a of the shutter blade 51, the shutter blade 51 is biased by the spring 56 to swing in a counterclockwise direction. The bias of the spring 56 is larger than that of the spring 63 biasing the stop plate 52. Accordingly, as shown in FIG. 4D, the shutter blade 51 swings in the counterclockwise direction such that the ridge portion 51a presses the stop plate 52. Therefore the stop opening 52a of the stop plate 52 is entirely disposed on the shutter blade 51 to swing with the shutter blade 51, and the shutter blade covers the shutter opening 48a again.

The operation of the present invention will be explained now. In the lens-fitted photo film unit 10 in which the shutter device 50 is loaded, the soft-focusing photograph mode (S) or the normal photograph mode (N) is selected by sliding the mode changer 15. When the soft focusing photography is performed, the mode changer is set to a position with a mark "S" and the soft focusing photograph mode is selected. In the soft focusing photograph mode, the flashlight is always emitted except making the front-lighted photograph in a fine day. Accordingly, before taking a photograph, the flash operation member 16 is slid to set in an ON position and start the flash device charging.

When the winding wheel 22 is rotated, the photo film 34 is wound for one frame to set behind the exposure aperture. Thereby the shutter is set to the charged condition, and the rotation of the winding wheel 22 is locked. In this condition, as shown in FIG. 4A, the shutter blade 51 is biased by the spring 56 to contact to the stopper 57 and to close the shutter opening 48a. Further, the stop plate 52 is biased by the spring 63 to contact to the retention end pin 15a of the mode changer 15.

After determining the subject distance as 3 m, the shutter button 18 is depressed. Thus the hitting lever 58 hits the end protrusion 51b and starts the shutter blade 51 swinging in the clockwise direction against bias of the spring 56. Then the small stop opening 52a comes to define the stop of f11 in front of the shutter opening 48a. The light from the object enters the shutter opening 48a into the light-shielding tube to make an exposure. Then the shutter blade 51 presses the segment 40a to the segment 40b to turn the sync switch 40 ON, and the flashlight is emitted from the flashlight emitter 39. According to the taking lens 12, a photographic distance, which is defined as a distance of an object from the photo film 34, is fixed to 6 m for forming a focused image of object, and a diameter of circle of confusion is about 0.015 mm while the subject distance is determined as 3 m. Under this condition, while the small stop opening 52a is formed, the image of the object is clearly formed with sharp outlines.

The hitting lever 58, after leaving the end protrusion 51b of the shutter lever 51, sequentially contacts to the end protrusion 52b of the stop plate 52. Then the stop plate 52 swings in a clockwise direction such that the shutter opening 48a may entirely appear. When entirely appearing, the shutter opening 48a forms the fully open stop of f5.6 to make an exposure. The object distance is set to 6 m, and a diameter of circle of confusion is about 0.03 mm while the subject distance is determined as 3 m. Under this condition, while the small stop opening 52a is formed, the image of the object is slightly faded.

Thereafter, the bias of the spring 63 swings back the stop plate 52 with the ridge portion 51a of the shutter blade 51 pressing the stop plate 52. Also, the shutter blade 51 is caused by the bias of the spring 56 to start rotating back. The shutter blade 51 and the stop plate 52 come back to the initial positions while the ridge portion 51a pushes the stop plate (see, FIG. 4D). Accordingly, in the soft focusing mode, a frame of the photo film 34 is sequentially exposed through the stops of f11 and f5.6.

FIG. 5 illustrates a variation of f-number depending on time while the shutter blade 51 moves from the closed position to the open position. P1 is a point at which the shutter opening 48a begins to appear by opening the shutter blades 51. At point Q1, the small stop opening 52a of f11 is set for entirely defining the stop. At a point Q2, in accordance with slide of the hitting lever 58, the shutter blade 51 entirely opens the shutter opening 48a to form the fully open stop of f5.6. At a point R1, the shutter blade 51 starts closing the shutter opening 48a. At a point P2, the shutter blade 51 entirely closes the shutter opening 48a. Further, S1 is a middle point of an increasing section 71 defined between P1 and Q1, and S4 is a middle point between Q1 and Q2. S3 is a middle point of decreasing section 72 defined between R1 and P2, and S2 is a middle point between S3 and P2. Note that the arrow α shows a timing of emitting the flashlight. Further, the hatched area β shows an exposure amount on the photo film 34.

A difference of time elements between S2 and S1 is an averaged exposure time t1 according to the small stop opening 52a, which is about 1/60 sec. A difference of time elements between S3 and Q2 is an averaged exposure time t2 according to the fully open stop, which is about 1/80 sec. A difference of time elements between S4 and S3 is an averaged exposure time t3 according to combination of the small stop opening 52a and the fully open stop, which is about 1/50 sec. In this combination, as the sharp image taken through the small stop opening 52a of f11 and the adequately faded images taken through the open stop of f5.6 are formed in the one frame, the image having a core and softness is formed. Note that such a portrait photograph should be taken with the lens-fitted photo film unit 10 in the evening or the cloudy day in order to increase the effect of the flashlight. When the lens-fitted photo film unit 10 is used in the fine day, the portrait photograph should be made in a rear light or a half rear light.

Figure 6A:
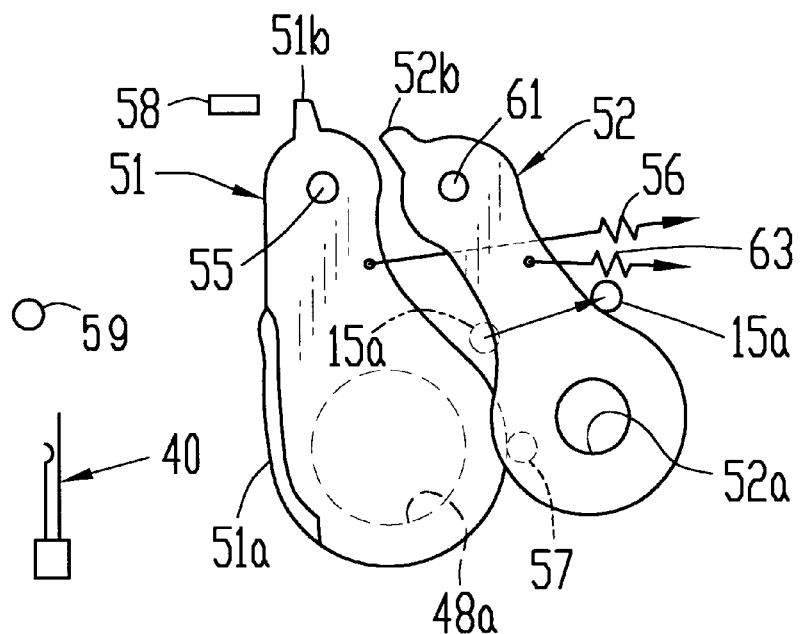
FIG. 6A is a front view of the shutter device of the present invention in a normal photograph mode.

When the normal photography is performed, the mode changer 15 is set to a position with a mark "N" and the normal photograph mode is selected. Then, as shown in FIG. 6A, the retention end pin 15a of the mode changer 15 shifts so that the spring 63 may bias the stop plate 52 to leave the shutter opening 48a. In this situation, the end protrusion 52b retracts from the orbit of the hitting lever 58. Note that the arrow with the phantom line illustrates the shift of the mode changer 15, and a circle of the phantom line is a position of the mode changer 15 in the soft focusing photograph mode.

Figure 6B:
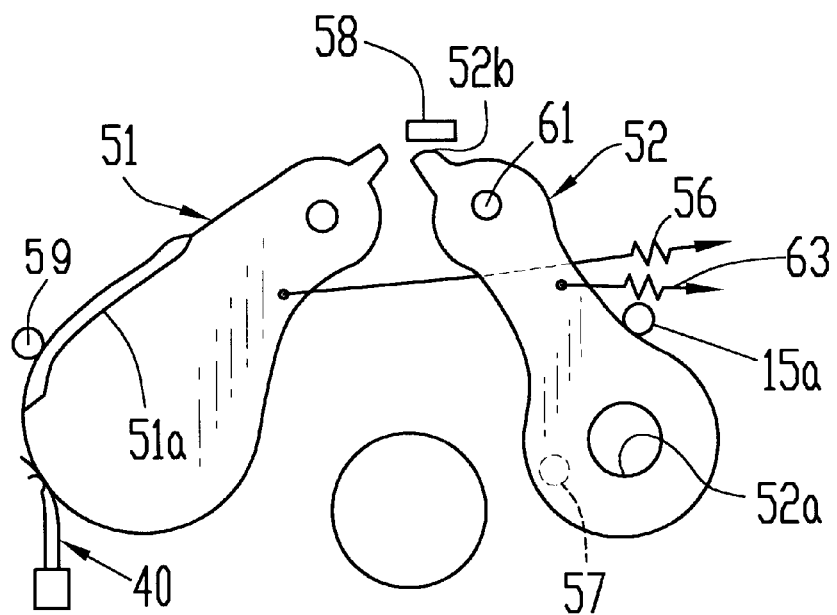
FIG. 6B is a same view as FIG. 6A, which illustrates a situation in photographic movement.

When the shutter button 18 is depressed, the hitting lever 58 is slid into a right side of the figure, contacts to the end protrusion 51b to swing the shutter blade 51 in the clockwise direction. As shown in FIG. 6B, the shutter opening 48a entirely appears by the rotating of the shutter blade 51. The stop is set at f5.6. Thereby as the hitting lever 58 hits only the shutter blade 51, the hitting lever 58 slides relatively smoothly, and the exposure time, namely the shutter speed, is approximately 1/100 sec. In this condition, the normal photography is performed. Note that, in the normal photograph mode, an exposure is taken through the stop of f5.6. It is preferable in taking a photograph to determine a subject distance by considering that an image can be photographed in-focus at the object distance of 6 m in the lens-fitted photo film unit 10.

In the above embodiment, the focal length of the taking lens is set to 32 mm, but may be set to 50 mm, for example. In this case, the object is located at a distance of about 4–4.5 m from the lens-fitted photo film unit 10 when the portrait photography is carried out. If the lens-fitted photo film unit 10 is designated such that the object distance for focusing may be 6 m, the diameter of circle of confusion according to the small stop of f11 is approximately 0.015 mm, and that according to the fully open stop of f5.6 is about 0.03 mm for the subject distance of 4.3 m from the lens-fitted photo film unit 10. The result is the same as the above embodiment.

According to the invention, an image is photographed sharply through the small stop, and photographed with relatively lower sharpness through the fully open stop. So the object distance for an in-focus state with the taking lens may be a value different from 6 m.

In spite of the above embodiment, the f-numbers of the fully open stop and the small stop are not restricted in f5.6 and f11, respectively. For example, the f-number of the fully open stop may be smaller than f8, to determine a larger aperture diameter. The f-number of the small stop may be larger than f10, to determine a smaller aperture diameter. Further, the averaged exposure time t1 according to exposure through the small stop is about 1/60 seconds, the averaged exposure time t2 according to exposure through the fully open stop is about 1/80 seconds, and the averaged exposure time t3 according to exposure in combination of the small stop and the fully open stop is about 1/50 seconds. However, the present invention is not restricted in them. The averaged exposure times t1, t2 and t3 may be respectively about 1/80, 1/100 and 1/70 seconds, when the photo film has higher sensitivity (such as ISO 800, ISO 1600).

In the above embodiment, the ridge portion is formed on the edge of the shutter blade. However, the present invention is not restricted in it. Instead of forming the ridge portion, a protruding which has a pin-like form may be provided.

Further, the present invention is not applied only to the lens-fitted photo film unit but also to a simple camera in which the photo film is changed and the focus mechanism and exposure adjusting mechanism are omitted. Further even in a simple camera having a focus mechanism, the soft focusing photography of the present invention can be carried out with the shutter device of the present invention. In this case, the object distance for an in-focus state is set to a predetermined value, for example, 6 m.

Also, it is possible in the embodiment to control the timing of return of the shutter blade and the stop plate by adjusting the strengths of the springs for biasing respectively those elements.

Various changes and modifications are possible in the present invention and may be understood to be within the present invention.

What is claimed is:

1. A shutter device included in a camera for making an exposure on a photo film through a shutter opening positioned at a taking lens, said shutter device comprising:
   a hitting member for moving in response to photographic operation;
   a shutter blade for covering said shutter opening, said shutter blade being hit by said hitting member to rotate in a first direction such that said shutter opening may be exposed, and said shutter blade rotating back in a second direction opposite to said first direction to return to an initial position; and
   a rotatable aperture stop plate in which a stop opening having a smaller diameter than said shutter opening is formed, wherein said stop plate, when set to a stop position, positions said stop opening at said shutter opening, and rotates in the first direction from said stop position after the rotating of said shutter blade.

2. A shutter device as claimed in claim 1, wherein said shutter blade starts swinging in the first direction after retracting from said stop opening.

3. A shutter device as claimed in claim 2, wherein said stop plate and said shutter blade are biased in the second direction respectively by spring biasing.

4. A shutter device as claimed in claim 3, wherein said hitting member hits one end portion of said stop plate after hitting said shutter blade to swing said stop plate in said first direction.

5. A shutter device as claimed in claim 4, wherein said hitting member moves away from said stop plate when said stop plate retracts from said shutter opening.

6. A shutter device as claimed in claim 4, wherein said shutter blade includes a ridge portion for restricting the swing of said stop plate in the first direction by contacting to said stop plate.

7. A shutter device as claimed in claim 6, wherein said ridge portion pushes back said stop plate to said stop position when said shutter blade swings in said second direction.

8. A shutter device as claimed in claim 2, wherein said camera further includes a flash device for emitting a flashlight and said flash device is actuated when the shutter blade is retracted from said stop opening.

9. A shutter device as claimed in claim 8, wherein said camera further includes a sync switch for actuating said flash device, and said shutter blade turns on said sync switch when said shutter blade retracts from said stop opening.

10. A shutter device as claimed in claim 8, wherein said stop plate is shiftable before said photographic operation to a retracted position in which said stop plate is retracted from said shutter opening, and only said shutter blade is swung by said photographic operation in said first direction to entirely expose said shutter opening if the stop plate is shifted to said retracted position.

11. A shutter device as claimed in claim 10, further including a retention pin for keeping said stop plate in the stop position against said spring biasing, and said stop plate shifting to said retract position by moving said pin.

12. A shutter device as claimed in claim 11, wherein said stop plate is biased in the second direction by said spring biasing, and swings by said spring biasing in said second direction to said retracted position when said retention pin moves.

13. A shutter device as claimed in claim 2, wherein an f-number in making photograph through said shutter opening only is smaller than f8.

14. A shutter device as claimed in claim 13, wherein the f-number in making photograph through said stop opening is larger than f10.

15. A shutter device as claimed in claim 14, wherein an object distance of said taking lens is substantially 6 m.

16. A shutter device as claimed in claim 2, wherein said camera is a lens-fitted photo film unit.

* * * * *